(12) United States Patent
Goldschmidt et al.

(10) Patent No.: US 6,823,426 B2
(45) Date of Patent: Nov. 23, 2004

(54) SYSTEM AND METHOD OF DATA REPLACEMENT IN CACHE WAYS

(75) Inventors: Marc A. Goldschmidt, Tempe, AZ (US); Roger W. Luce, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/028,188

(22) Filed: Dec. 20, 2001

(65) Prior Publication Data

US 2003/0120870 A1 Jun. 26, 2003

(51) Int. Cl.[7] .......................... G06F 12/12; G06F 12/08
(52) U.S. Cl. ...................... 711/134; 711/128; 711/133; 711/136; 711/159; 711/160
(58) Field of Search .................................. 711/133, 118, 711/122, 128, 136, 3, 134, 159, 160

(56) References Cited

U.S. PATENT DOCUMENTS

| | | | | |
|---|---|---|---|---|
| 5,822,759 A | * | 10/1998 | Treynor | 711/134 |
| 5,875,465 A | * | 2/1999 | Kilpatrick | 711/134 |
| 5,974,507 A | | 10/1999 | Arimilli et al. | |
| 5,974,508 A | * | 10/1999 | Maheshwari | 711/133 |
| 6,047,358 A | * | 4/2000 | Jacobs | 711/133 |
| 6,202,129 B1 | * | 3/2001 | Palanca et al. | 711/133 |
| 6,378,044 B1 | * | 4/2002 | Luce et al. | 711/133 |
| 6,490,654 B2 | * | 12/2002 | Wickeraad et al. | 711/133 |
| 6,584,547 B2 | * | 6/2003 | Palanca et al. | 711/133 |
| 2001/0049771 A1 | * | 12/2001 | Tischler et al. | 711/133 |
| 2002/0188808 A1 | * | 12/2002 | Rowlands et al. | 711/133 |

FOREIGN PATENT DOCUMENTS

EP       0687979       12/1995

* cited by examiner

*Primary Examiner*—Mano Padmanabhan
*Assistant Examiner*—Jasmine Song
(74) *Attorney, Agent, or Firm*—Blakely, Sokoloff, Taylor & Zafman LLP

(57) ABSTRACT

Disclosed are a system and method of replacing data in cache ways of a cache memory array. If one or more cache ways are locked from replacement, a cache way may be selected from among the unlocked cache ways based upon a pseudo random selection scheme.

30 Claims, 4 Drawing Sheets

SYSTEM AND METHOD OF DATA REPLACEMENT IN CACHE WAYS

BACKGROUND

1. Field

The subject matter disclosed herein relates to cache memory systems. In particular, the subject matter disclosed herein relates to the dynamic replacement of data items in cache memory systems.

2. Information

A processing system typically hosts procedures to process data which is stored in a system memory. Such a processing system typically retrieves instructions and data items from the system memory by initiating requests to retrieve data located in the system memory at a system memory address. Similarly, a processing system may store data in the system memory by initiating requests to store data in the system memory at a system memory address.

Following a request by a processing system to either store data in or retrieve data from a system memory, a latency typically follows such a request before such a storage or retrieval is completed. In the case of a request to retrieve data, a processing system may suspend execution during such a latency until the requested data is received for processing. Longer latencies following a request to retrieve data may therefore degrade real-time performance of such processing systems.

In addition to a system memory, a processing system may comprise one or more cache memories to store data which may be retrieved with a shorter latency than a latency associated with retrieving data from the system memory. To improve performance of the processing system, certain data items in the system memory which are expected to be accessed frequently may also be stored in the cache memory to reduce latencies associated with retrieving these data items.

Portions of data stored in a cache memory may be dynamically replaced with data items in the system memory. These data items in the system memory may be expected to be accessed by the processing system with greater frequency than data items in the cache being replaced. How data items in a cache memory are selected for replacement can affect the performance of a processing system to the extent that subsequent accesses to the replaced data items may introduce increased latencies over accessing the replaced data items from the cache memory.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations one or more data objects. However, this is merely an example of machine-readable instructions and embodiments of the present invention are not limited in this respect.

"Storage medium" as referred to herein relates to media capable of maintaining expressions which are perceivable by one or more machines. For example, a storage medium may comprise one or more storage devices for storing machine-readable instructions. However, this is merely an example of a storage medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Also, logic may comprise machine-executable instructions stored in a storage medium in combination with processing circuitry to execute such machine-executable instructions. However, these are merely examples of structures which may provide logic and embodiments of the present invention are not limited in these respects.

A "processing system" as discussed herein relates to a combination of processing resources to accomplish computational tasks. Such processing resources may comprise a combination of hardware and software resources. However, this is merely an example of a processing system and embodiments of the present invention are not limited in this respect. A "host processing system" relates to a processing system which may be adapted to communicate with a "peripheral device." For example, a peripheral device may provide inputs to or receive outputs from an application process hosted on the host processing system. However, embodiments of the present invention are not limited in this respect.

A "data bus" as referred to herein relates to circuitry for transmitting data between devices. For example, a data bus may transmit data between a host processing system and a peripheral device. However, this is merely an example of a data bus and embodiments of the present invention are not limited in this respect. A "bus transaction" as referred to herein relates to an interaction between devices coupled in a bus structure wherein one device transmits data addressed to the other device through the bus structure.

A "memory array" as referred to herein relates to one or more devices in which data may be stored in or retrieved from physically addressable memory locations. Such physically addressable locations may comprise consecutively addressable data words having the capacity to store a uniform number of data bits. A memory array may be formed in any one of several mediums such as, for example, semiconductor, optical or magnetic media. However, these are merely examples of a memory array and embodiments of the present invention are not limited in these respects.

A "core processing circuit" as referred to herein relates to logic formed in a device which is capable of executing logical instructions. A core processing circuit may execute logical instructions defining data as inputs to the instructions. In one example of a core processing circuit, the core processing circuit may execute logical instructions stored in a memory array. In another example, a core processing circuit may comprise more than one synchronized processing elements which execute logical instructions stored in a common memory array or distinct memory arrays. However, these are merely examples of a core processing circuit and embodiments of the present invention are not limited in these respects.

A processing system may comprise a core processing circuit and a "system memory" or "main memory" to store data and instructions which are executable by the core processing circuit. For example, the system memory may store programs, and data available to such programs, upon execution by the core processing circuit. Data and instructions may be stored in physical memory locations which are addressable by the core processing circuit. However, these are merely examples of a system memory and embodiments of the present invention are not limited in these respects.

A core processing circuit may encounter latencies in the course of writing to or reading from memory locations in a system memory. In addition to accessing data and instructions from a system memory, a core processing circuit may also retrieve data and instructions from locations in a "cache memory array" with shorter latencies than those associated with accessing data and instructions from a system memory. However, this is merely an example of a cache memory array and embodiments of the present invention are not limited in this respect.

A processing system may comprise multiple cache memory arrays where each cache memory array is used for a corresponding "level" of cache. For example, a processing system may comprise a "primary" level of cache associated with a shortest access latency and a "secondary" level of cache with a longer access latency (but perhaps still shorter than a latency associated with accessing system memory). However, this is merely an example of a multi-level cache system and embodiments of the present invention are not limited in this respect.

A "cache controller" as referred to herein relates to logic associated with one or more cache memory arrays enabling access to memory locations in the one or more cache memory arrays. For example, a cache controller may comprise logic to select one or more portions of data to be stored in a cache memory array. A cache controller may also comprise logic identify portions of data in a system memory which are in an associated cache memory array. A cache controller may also comprise logic to write data to or read data from memory locations in an associated cache memory array. However, these are merely examples of a cache controller and embodiments of the present invention are not limited in this respect.

A cache memory array may be partitioned into a plurality of "cache ways." Each cache way may store data corresponding with data stored in a system memory. For example, a cache way may store data in data lines which match corresponding data lines stored in locations of a system memory. However, this is merely an example of a cache way and embodiments of the present invention are not limited in these respects.

"Cache replacement" as referred to herein relates to a process of replacement of data stored in a cache memory array with other data. For example, a cache replacement process may replace data stored in a cache way from a first portion of a system memory with other data stored in second portion of the system memory at an addressable location in the system memory. However, this is merely an example of cache replacement and embodiments of the present invention are not limited in these respects.

A cache controller may perform cache replacement for data in cache ways according to a "least recently used" scheme whereby a cache way may be selected for replacement of a portion of data based upon the frequency in which the portion of data in the cache way was accessed over a duration. For example, a cache controller may implement a least recently used scheme by maintaining a record indicative of the frequency with which a portion of one or more cache ways have been accessed over a period, and selecting a cache way for replacement based upon such a record. In an alternative approach, a cache controller may employ a least recently used scheme by implementing an n-bit code to approximate a least recently used portion of a cache way based upon a most recently used cache way known as a "pseudo" least recently used scheme. However, these are merely examples of a least recently used replacement scheme which may be used for selecting cache ways for replacement, and embodiments of the present invention are not limited in these respects.

A cache controller may also perform cache replacement for data in cache ways according to a "pseudo random selection" scheme whereby a cache way may be selected for replacement of a portion of data independently of the frequency with which portions of any cache way have been accessed. For example, a cache way may be pseudo randomly selected for replacement of a portion of data based upon a pseudo random number provided to a cache controller when a selection is to be made. However, this is merely an example of a pseudo random selection scheme and embodiments of the present invention are not limited in this respect.

A cache replacement scheme may be inhibited or prevented from replacing data in one or more cache ways which are "locked from replacement." For example, a cache replacement scheme may select a cache way in a cache memory array for replacement of a portion of data therein from among cache ways in the cache memory array which are not locked from replacement. However, this is merely an example of how one or more cache ways in a cache memory array may be locked from replacement and embodiments of the present invention are not limited in this respect.

Briefly, an embodiment of the present invention relates to a system and method of replacing data in cache ways of a cache memory array. If one or more cache ways are locked from replacement, a cache way may be selected from among the unlocked cache ways based upon a pseudo random selection scheme. However, this is merely an example embodiment and other embodiments of the present invention are not limited in these respects.

Figure 1:
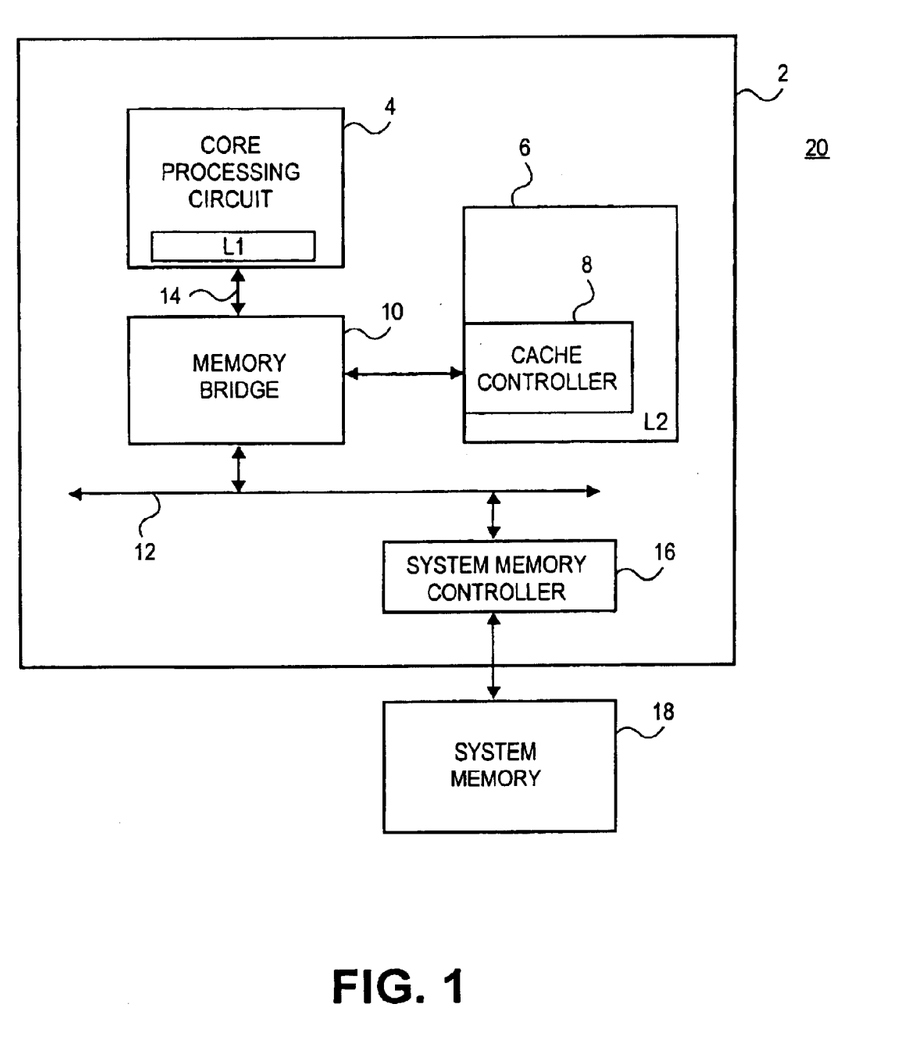
FIG. 1 shows schematic diagram of a processing platform according to an embodiment of the present invention.

FIG. 1 shows schematic diagram of a processing platform 20 according to an embodiment of the present invention. The processing platform 20 comprises a core processing circuit 4 which may execute machine-readable instructions to process data. In the illustrated embodiment, the core processing circuit 4 may retrieve instructions and data from memory such as a primary cache memory L1 formed with the core processing circuit 4. The core processing circuit 4 may also access data stored in a memory through a core memory bus 14 and a memory bridge 10. For example, the core processing circuit 4 may access data stored in a system memory 18 by initiating a read or write bus transaction on a data bus 12 addressed to a system memory controller 16. Also, the core processing circuit 4 may access data stored in a cache memory array 6 through a cache controller 8. However, these are merely examples of how a core processing circuit in a processing platform may access data from one or more memory systems, and embodiments of the present invention are not limited in these respects.

According to an embodiment, access to data stored in a memory location of the system memory 18 from the core processing circuit 4 may be associated with a latency. Such a latency may result from, for example, latencies associated with completing a read or write bus transaction on the data bus 12 and a latency associated with executing logic at the system memory controller 16 to read data from or write data to addressable locations in the system memory 18. Access to data stored in the cache memory array 6 may be associated with a shorter latency comprising a latency associated with the cache controller 8 in writing data to or reading data from locations in the cache memory array 6.

In the illustrated embodiment, the cache memory array 6 may be partitioned into a plurality of cache ways to store data which is accessible through the cache controller 8. One or more of the cache ways may store portions of data which is also stored in a location of the system memory 18. The cache controller 8 may comprise logic to associate data in one or more cache ways with addresses to memory locations in the system memory 18 storing the same data.

The memory bridge 10 may receive memory read and write requests on the core memory bus 14 (from the core processing circuit 4) which are addressed to locations in the system memory 18. In the illustrated embodiment, the memory bridge 10 may comprise logic to query the cache controller 8 to determine whether the data addressed by the request is stored in one of the cache ways of the cache memory array 6. If the data addressed by the request is stored in one of the cache ways, the read or write request may be executed by accessing the data in the cache way via the cache controller 8 (If the request is a write request, the memory bridge 10 may also initiate a write transaction on the data bus 12 to "write back" or "write through" to the associated portion addressed in the system memory 18). Otherwise, the memory bridge 10 may execute the read or write request to the system memory 18 by initiating one or more bus transactions on the data bus 12.

Figure 2:
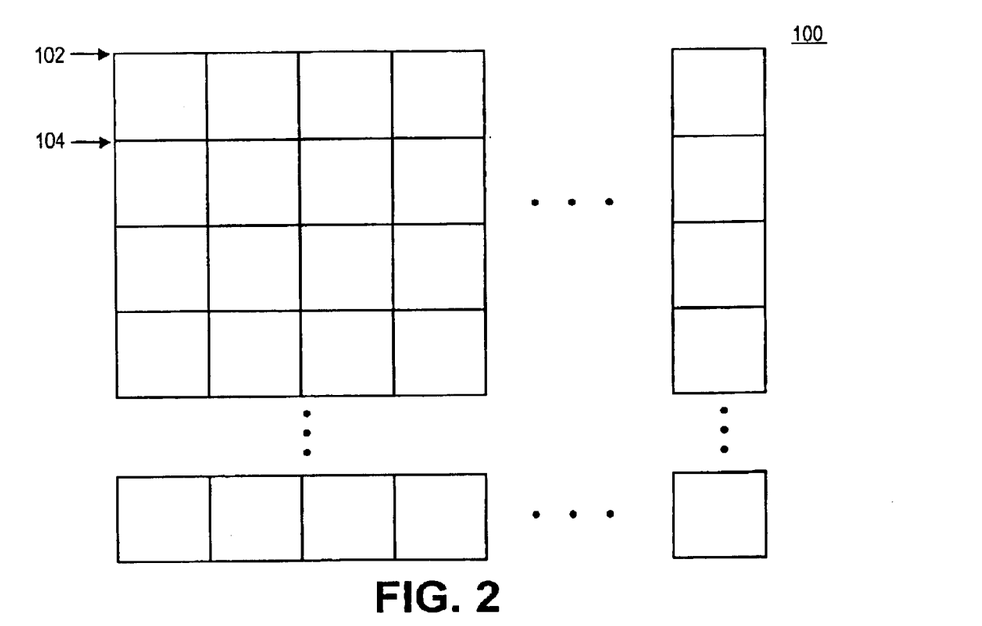
FIG. 2 shows a schematic diagram of a system memory according to an embodiment of the present invention illustrated in FIG. 1.

FIG. 2 shows a schematic diagram of a system memory 100 according to an embodiment of the system memory 18 in the processing platform 20 illustrated in FIG. 1. The system memory 100 may comprise any one of several volatile or non-volatile memory devices to store data such as dynamic random access memory (DRAM), dual rate DRAM (DDR), synchronous DRAM, flash RAM, Static RAM, read only memory or the like. However, these are merely examples of types of devices which may be used to form a system memory and embodiments of the present invention are not limited in this respect.

The system memory 100 may be partitioned into a plurality of addressable memory pages comprising a uniform number of bytes or data lines. Each page may comprise a plurality of data lines where a first data line is located at a beginning line address 102 and a last data line is located at an ending line address 104. However, this is merely an example of how a system memory may be partitioned and embodiments of the present invention are not limited in this respect.

Figure 3:
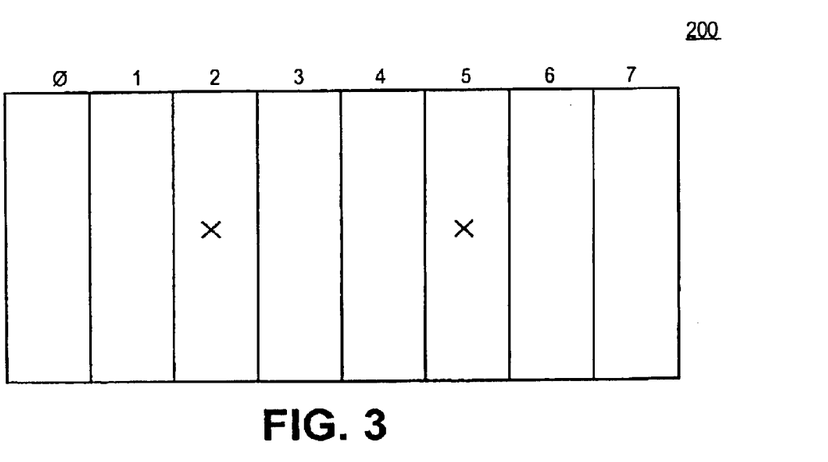
FIG. 3 shows a schematic diagram of a cache memory array according to an embodiment of the present invention illustrated in FIG. 1.

FIG. 3 shows a schematic diagram of a cache memory array 200 according to an embodiment of the cache memory array 6 of the processing platform 20 illustrated in FIG. 1. The cache memory array 200 comprises eight cache ways which are numbered from 0 to 7. Each cache way may store data lines that are also stored in a system memory to enable access to data in the data lines from the cache memory array with a lower latency than from accessing the data from the system memory. However, this is merely an example of how a cache memory array may be partitioned in to cache ways and embodiments of the present invention are not limited in this respect. According to an embodiment, the cache memory array 200 may be formed in a static random access (SRAM) device. However, this is merely an example of how a cache memory array may be formed and embodiments of the present invention are not limited in this respect.

Each cache way may store a set number of data lines from the system memory (e.g., 512 data lines per cache way) where each line has a set number of bytes (e.g., 64 bytes per data line). According to an embodiment, a system memory address may comprise a plurality of bits (e.g., a 32 bit system memory address) of which least significant bits (LSBs) may correspond with byte level addressing (e.g., bits 0–5) and most significant bits (MSBs) may correspond with page level addressing (e.g., bits 15–31). Bits in a system memory address between these MSBs and LSBs (e.g., bits 6–14) may correspond with data line level addressing. However, this is merely an example of how a system memory address may be partitioned to reference specific portions of data in a system memory and embodiments of the present invention are not limited in this respect.

Figure 4:
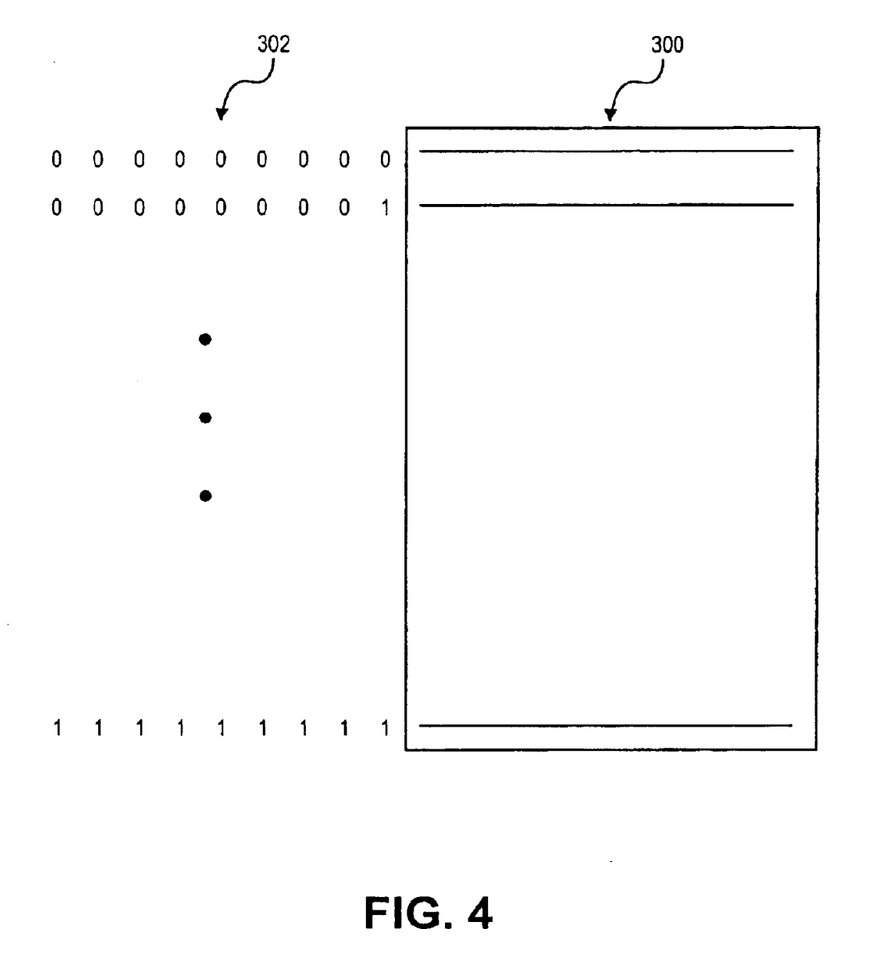
FIG. 4 shows a schematic diagram illustrating data line addressing in a cache way according to an embodiment of the present invention shown in FIG. 3.

FIG. 4 shows a schematic diagram illustrating data line addressing in a cache way 300 according to an embodiment of the present invention shown in FIG. 3. Each data line in the cache way 300 is placed according to the data line address of its corresponding system memory address. In the illustrated example, each data line is associated with a data line address 302 comprising nine bits from the corresponding system memory address of the data line (e.g., bits 6–14 between MSBs and LSBs) such that the cache way 300 may store 512 data lines. It should be noted that the data lines in the cache way 300 may be from non-contiguous portions of the system memory such that, while the data lines may be associated with consecutive data line addresses, the data lines may be discontiguous in the system memory and originate from different memory pages in the system memory.

Figure 5:
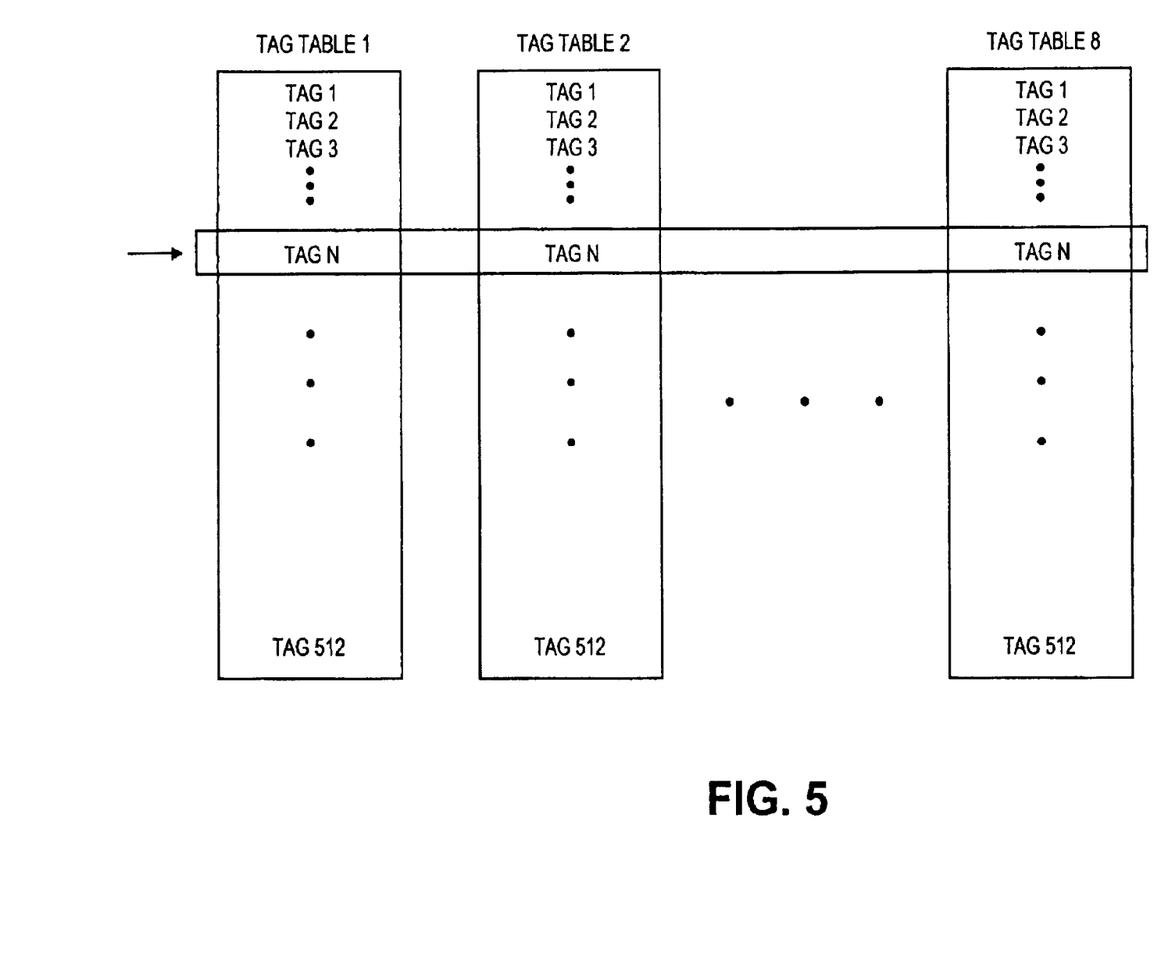
FIG. 5 shows a schematic diagram illustrating a tag table according to an embodiment of the present invention shown in FIG. 4.

The MSBs of the system memory addresses for each of the data lines in the cache way 300 may correspond with "tags" which are stored in a tag table associated with the cache way 300. FIG. 5 shows a plurality of tag tables, one tag table corresponding with each cache way, which may be maintained in a portion of the cache memory array separately from the cache ways storing data lines from the system memory according to an embodiment of the cache way 300 shown in FIG. 4. Each tag table stores a tag for each data line in the associated cache way at a location corresponding with the data line in the cache way. In the illustrated embodiment, each tag table may store tags in an order corresponding with the order of the data line addresses of the corresponding data lines stored in the cache way 300.

A memory access request for a data item may be associated with a system memory address (of the requested data item) comprising bits corresponding to a data line address and MSBs. The data line address bits may correspond to a tag table line in each tag table enabling a cache controller to compare the MSBs of the system memory address with tags in each of the tag tables at the tag table line. In the illustrated example, a data line address of a system memory address (associated with a memory access request) "N" may correspond to a tag table line in each tag table. If the cache controller finds a match between the MSBs and a tag in a tag table at its tag table line N, resulting in a "cache hit," the requested data item may be fetched from the corresponding line N of the cache way associated with the tag table where the cache hit occurred. If the MSBs do not match any tags in tag tables at the appropriate line, the requested data item may be retrieved from the system memory.

According to an embodiment, a data line in a cache way may be replaced with a different data line from the system memory (e.g., a data line in the system memory that is not already stored in one of the cache ways). Such a replacement of a data line in a cache way may occur when no cache hit occurs from an attempted to access data from a particular data line address in cache memory array, and all ways in the cache memory array already contain valid data at that particular data line address. To execute such a replacement, a cache controller may select a cache way to receive a new data line from the system memory. The cache controller may then replace data in a data line of the selected cache way with the new data line at a corresponding data line address. However, this is merely an example of how a cache controller may replace data in a cache way with data from a portion of a system memory and embodiments of the present invention are not limited in this respect.

To replace a data line in a cache way with a new data line (e.g., following a cache miss for a request for a data item in the new data line), a cache controller may initially attempt to replace a data line in a cache way that is storing invalid data. If any of the cache ways contain an invalid data line at the data line address corresponding with the new data line, the cache controller may replace the invalid data line with the new data line. However, if each cache way stores valid data in the data line at the data line address, the cache controller may select any one of several schemes to select a cache way for the data line replacement.

In one embodiment, for example, a cache controller may employ a least recently used (LRU) scheme to select a cache way for replacement of a data line with valid data with data from a new data line. The cache controller may initially identify candidate cache ways for replacement. In one embodiment, the cache controller may then select a cache way (from among the candidate cache ways) that had not been accessed since the last access to each of the other candidate cache ways. In an embodiment illustrated with reference to the cache memory array 200 of FIG. 3, for example, the cache controller may maintain three bits to identify which of the eight cache ways was the least recently used cache way. These bits may be updated every time an access is made to the cache memory array 200 to identify the least recently used cache way.

In an alternative LRU scheme, a cache controller may employ a pseudo LRU scheme by maintaining an n-bit code for each data line address to approximate the LRU cache way for the data line address based upon the most recently used cache way at the data line address. For example, the cache controller may maintain n-bits for each data line address to identify the LRU cache way at the data line address. These bits may then be updated for each time a data line is accessed from a cache way at the associated data line address based upon the cache way that the accessed data line is residing in. However, these are merely examples of how an LRU scheme may be employed to select a cache way for replacement and embodiments of the present invention are not limited in this respect.

According to an embodiment, one or more cache ways in the cache memory array 200 may be "locked" from replacement to prevent data in the locked cache ways from being replaced by a cache controller with new data from a portion of a system memory. In the example illustrated in FIG. 3, an "X" on cache ways 2 and 5 indicate that these cache ways are locked from replacement. According to an embodiment, a core processing circuit may write to a control register defining which cache ways are to be locked. Upon detecting that new data from the system memory is to be stored in a cache way, a cache controller may select from among candidate unlocked cache ways (e.g., cache ways 0, 1, 3, 4, 6 and 7 as illustrated in FIG. 3).

According to an embodiment, a cache controller may employ a particular scheme to select a cache way for a data line replacement based upon the whether any cache ways in the cache memory array 200 are locked from replacement. If no cache ways have been locked from replacement, for example, the cache controller may employ an LRU scheme to select cache ways for replacement as illustrated above. However, if one or more of the cache ways have been locked from replacement, the cache controller may employ a different scheme to select cache ways for replacement. For example, the cache controller may employ a pseudo random cache way selection scheme whereby the cache controller may pseudo randomly select a cache way for replacement from among the candidate, unlocked cache ways. However, this is merely an example of how a cache controller may employ different cache replacement schemes for cache ways in a cache memory array depending upon whether one or more of the cache ways are locked from replacement, and embodiments of the present invention are not limited in this respect.

According to an embodiment, a cache controller may employ any one of several techniques to pseudo randomly select a cache way for replacement from among candidate unlocked cache ways. For example, a cache controller may maintain a cyclic counter which is incremented on cache clock cycles (or frequency divided cache clock cycles) and select a cache way for replacement from among candidate cache ways based upon the counter value. Such a cyclic counter may have a value from zero to the number of cache ways in the cache memory array minus one. When a cache controller is to replace data in one of the candidate cache ways, the cache controller may incrementally traverse consecutive cache ways by the counter value while skipping over any locked cache ways. However, this is merely an example a technique to pseudo randomly select a cache way for replacement from among candidate unlocked cache ways and embodiments of the present invention are not limited in this respect.

In the embodiment of the cache memory array 200 illustrated in FIG. 3 with eight cache ways, a scheme for pseudo random selection of cache ways for data line replacement may be implemented using a cyclic counter value maintained by incrementing a three bit cyclic value on cache clock cycles (or frequency divided clock cycles thereof). When the cache controller is to select a cache way for replacement of data, the cache controller may traverse the unlocked cache ways by the value of the three bit counter to pseudo randomly select a cache way for replacement starting with the lowest numbered unlocked cache way. If, for example, cache ways 2 and 5 of cache memory array 200 are locked as illustrated in FIG. 3, the order of traverse would be 0,1,3,4,6,7,0 . . . .

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A system comprising:
   a system memory;
   a cache memory array to store portions of data in the system memory in a plurality of cache ways; and
   a cache controller comprising replacement scheme selection logic to select a scheme for the selection of a cache way in the cache memory array for replacement of a portion of data in said selected cache way from among a plurality of selection schemes, the replacement scheme selection logic to select a pseudo random selection scheme for selection of said selected cache way if one or more cache ways in the cache memory array is locked from replacement.

2. The system of claim 1, wherein the plurality of selection schemes comprises at least the pseudo random selection scheme and a least recently used selection scheme, the replacement scheme selection logic further comprising logic to select the least recently used selection scheme for selection of the selected cache way if no cache ways in the cache memory array are locked from replacement.

3. The system of claim 2, wherein the least recently used selection scheme is a pseudo least recently used selection scheme.

4. The system of claim 1, wherein the system further comprises a core processing circuit comprising a first level of cache memory and wherein the cache memory array comprises a second level of cache memory.

5. The system of claim 4, wherein the system further comprises a memory bridge coupled between the core processing circuit and the system memory.

6. The system of claim 1, wherein the cache controller further comprises logic to selectively lock one or more cache ways from replacement in response to data in a control register.

7. The system of claim 1, wherein the cache controller further comprises logic to replace data in a data line of the selected cache way with data in a data line from the system memory, the data line of the system memory comprising a data line address corresponding with the data line in the selected cache way.

8. The system of claim 7, wherein the cache controller comprises logic to select a cache way for the replacement of a data line at a data line address having invalid data stored therein, and wherein the replacement scheme selection logic selects the pseudo random selection scheme for selecting the selected cache way for the replacement of a data line at the data line address only if each cache way stores valid data at the data line address and if one or more cache ways is locked from replacement.

9. A method comprising:
   storing portions of data in a system memory in a plurality of cache ways of a cache memory array; and
   selecting a pseudo random selection scheme for selecting a cache way in the cache memory array for replacement of a portion of data in said selected cache ways the pseudo random selection scheme being selected from among a plurality of replacement selection schemes, if one or more cache way in the cache memory array is locked from replacement.

10. The method of claim 9, wherein the plurality of replacement selection schemes further comprises a least recently used replacement selection scheme, and wherein the method further comprises selecting the least recently used replacement selection scheme for the selection of said selected cache way in the cache memory array for replacement if no cache ways in the cache memory array are locked from replacement.

11. The method of claim 10, wherein the least recently used replacement selection scheme is a pseudo least recently used selection scheme.

12. The method of claim 9, wherein the method further comprises:
   defining a first level of cache memory at a core processing circuit; and
   accessing the cache memory array as a second level of cache memory.

13. The method of claim 12, wherein the method further comprises accessing the cache memory array through a bridge coupled between the core processing circuit and the system memory in response to the core processing circuit.

14. The method of claim 9, wherein the method further comprises selectively locking one or more cache ways from replacement in response to data in a control register.

15. The method of claim 9, wherein the method further comprises replacing data in a data line in the selected cache way with data in a data line from the system memory, the data line from the system memory comprising a data line address corresponding with the data line in the selected cache way.

16. The method of claim 15, the method further comprising:
   selecting a cache way for the replacement of a data line at a data line address having invalid data stored therein; and
   selecting a cache way for the replacement of a data line at the data line address based upon the pseudo random selection scheme if each cache way stores valid data at the data line address and if one or more cache ways is locked from replacement.

17. A cache controller comprising:
   logic to selectively replace data in cache ways of a cache memory array;
   logic to lock one or more of the cache ways from replacement; and
   replacement scheme selection logic to select a scheme for the selection of a cache way in the cache memory array for replacement of a portion of data in said selected cache way from among a plurality of selection schemes, the selection logic to select a pseudo random selection scheme for selection of said selected cache way if one or more cache ways in the cache memory array is locked from replacement.

18. The cache controller of claim 17, wherein the the plurality of selection schemes further comprises a least recently used selection scheme, and wherein the replacement scheme selection logic selects the least recently used selection scheme for the selection of the selected cache way in the cache memory array for replacement if no cache ways in the cache memory array are locked from replacement.

19. The cache controller of claim 18, wherein the least recently used scheme is a pseudo least recently used scheme.

20. The cache controller of claim 17, wherein the cache controller further comprises logic to selectively lock one or more cache ways from replacement in response to data in a control register.

21. The cache controller of claim 17, wherein the cache controller further comprises logic to replace data in a data line in the selected cache way with data in a data line from the system memory, the data line from the system memory comprising a data line address corresponding with the data line in the selected cache way.

22. The cache controller of claim 21, wherein the cache controller comprises logic to select a cache way for the replacement of a data line at a data line address having invalid data stored therein, and wherein the replacement scheme selection logic selects the pseudo random selection scheme for the replacement of a data line at the data line address based-upon only if each cache way stores valid data at the data line address and if one or more cache ways is locked from replacement.

23. An apparatus comprising:
means for storing portions of data in a system memory in a plurality of cache ways of a cache memory array; and
means for selecting a pseudo random selection scheme for selecting a cache way in the cache memory array for replacement of a portion of data in said selected cache way, the pseudo random selection scheme being selected from among a plurality of replacement selection schemes, if one or more cache way in the cache memory array is locked from replacement.

24. The apparatus of claim 23, wherein the plurality of replacement selection schemes further comprises a least recently used replacement selection scheme, and wherein the apparatus further comprises means for selecting the least recently used replacement selection scheme for the selection of said selected cache way in the cache memory array for replacement if no cache ways in the cache memory array are locked from replacement.

25. The apparatus of claim 24, wherein the least recently used replacement selection scheme is a pseudo least recently used scheme.

26. The apparatus of claim 23, wherein the apparatus further comprises:
means for defining a first level of cache memory at a core processing circuit; and
means for accessing the cache memory array as a second level of cache memory.

27. The apparatus of claim 26, wherein the apparatus further comprises means for accessing the cache memory array from the core processing circuit through a bridge coupled between the core processing circuit and the system memory.

28. The apparatus of claim 23, wherein the apparatus further comprises means for selectively locking one or more cache ways from replacement in response to data in a control register.

29. The apparatus of claim 23, wherein the apparatus further comprises means for replacing data in a data line in the selected cache way with data in a data line from the system memory, the data line from the system memory comprising a data line address corresponding with the data line in the selected cache way.

30. The apparatus of claim 29, wherein the apparatus further comprises
means for selecting a cache way for the replacement of a data line at a data line address having invalid data stored therein; and
means for selecting a cache way for the replacement of a data line at the data line address based upon the pseudo random selection scheme if each cache way stores valid data at the data line address and if one or more cache ways is locked from replacement.

* * * * *

UNITED STATES PATENT AND TRADEMARK OFFICE
CERTIFICATE OF CORRECTION

PATENT NO. : 6,823,426 B2
DATED : November 23, 2004
INVENTOR(S) : Goldschmidt et al.

It is certified that error appears in the above-identified patent and that said Letters Patent is hereby corrected as shown below:

Column 10,
Line 4, after "and", delete "if".
Line 11, delete "ways" and insert -- way --.

Column 11,
Line 28, after "address" delete "based-upon".

Signed and Sealed this

Twenty-eighth Day of June, 2005

JON W. DUDAS
*Director of the United States Patent and Trademark Office*